July 23, 1929. L. GERSTENZANG 1,721,815
PROCESS AND APPARATUS FOR MANUFACTURING MEDICAL SWABS
Filed Oct. 29, 1927 4 Sheets-Sheet 3

July 23, 1929.     L. GERSTENZANG     1,721,815
PROCESS AND APPARATUS FOR MANUFACTURING MEDICAL SWABS
Filed Oct. 29, 1927     4 Sheets-Sheet 4
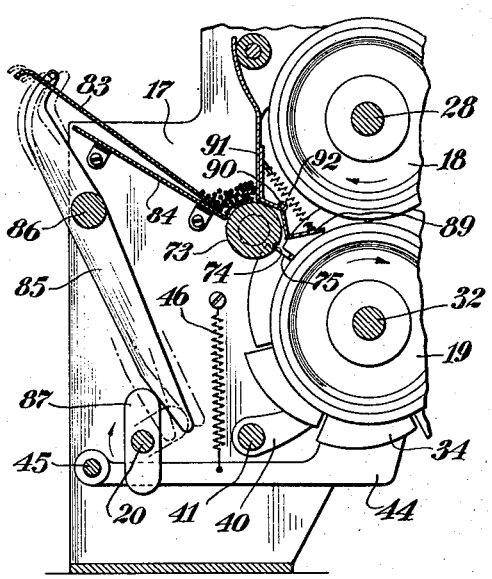
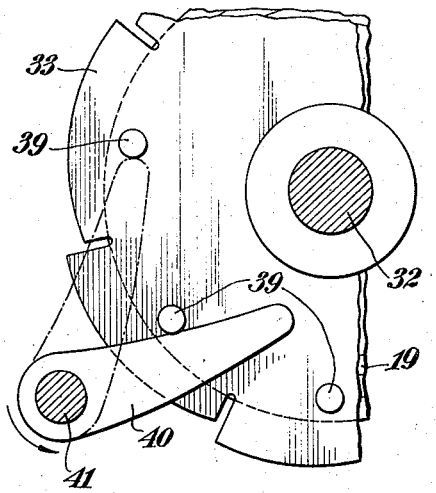
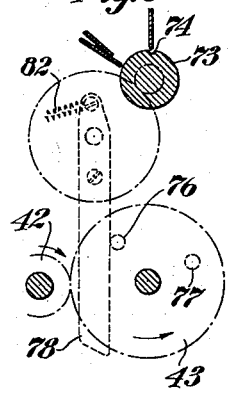
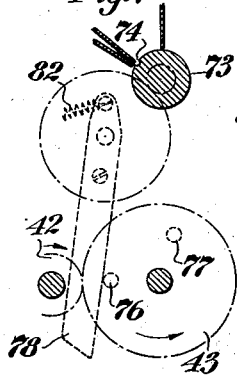
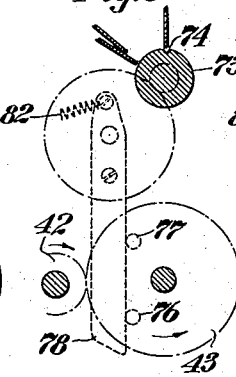
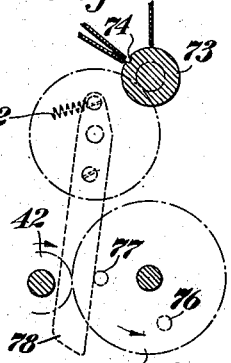
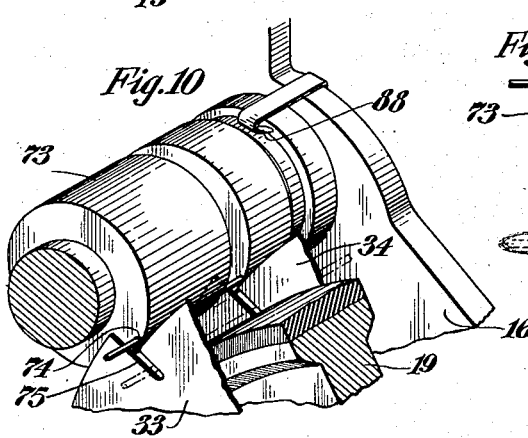
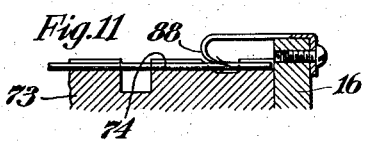
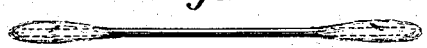
INVENTOR
Leo Gerstenzang
BY
William S. Shew
ATTORNEY Patented July 23, 1929.

1,721,815

UNITED STATES PATENT OFFICE.

LEO GERSTENZANG, OF LONG BEACH, NEW YORK.

PROCESS AND APPARATUS FOR MANUFACTURING MEDICAL SWABS.

Application filed October 29, 1927. Serial No. 229,563.

My present invention relates generally to medical swabs and has particular reference to a machine for manufacturing such swabs in quantity; and coordinately to a novel type of swab produced thereby.

My invention relates to the type of swab which has heretofore been constructed mainly by hand by wrapping a wad of absorbent cotton about the end of a small stick. It is one object of my invention to provide a machine for turning out such articles in large quantities and at a rapid rate. More particularly, it is an object to provide a machine for the production of double-end swabs, i. e., a stick having its opposite ends associated with small wads of cotton.

Another object is to provide a machine which will medicate the swabs during their manufacture.

A still further object lies in providing means for treating the stick during the manufacture of the completed article so that the cotton wads associated therewith will be securely held in position.

Briefly, the machine constructed in accordance with my invention is provided with a receptacle or hopper for a supply of the untreated sticks, and the structure, mechanism, and arrangement is such that the sticks are successively grasped, treated, twirled, and then discharged. The twirling is accomplished in such a way that an operator may apply wads of cotton to the opposite ends of each successive stick. Furthermore, mechanism is provided for medicating these applied wads or completed swabs prior to the discharge thereof.

It is a feature of my invention to provide an arrangement whereby the entire manufacture is automatic except for the feeding of untreated sticks to the hopper and the application of cotton wads to the opposite ends of successively twirled sticks.

As to certain phases of my invention, it is not limited to the manufacture of articles of the character mentioned. For example, a particular feature resides in the mechanism for successively withdrawing sticks from a supply thereof in a reliable and efficient manner.

Other features of my invention reside in the particular construction and arrangement of parts relating broadly to a step by step mechanism which in the specific application illustrated and described transports the sticks successively from the supply thereof to and through various operating positions and thence out.

It is a coordinate object of my invention to provide a novel type of medical swab wherein a wad of cotton or similar material is firmly associated in a compact and efficient manner with the end of a stick, and wherein the completed swab is of a premedicated character.

In connection with the last mentioned object of my invention, it is a feature to provide a stick having a partially whittled portion embedded in the swab proper, the partial whittling having been so effected that an accidental removal of the swab from the stick is practically impossible.

For the attainment of the foregoing objects and such other objects as may hereinafter appear or be pointed out, I have illustrated one form of my invention in the accompanying drawings in which—

Fig. 4 is a fragmentary side view taken in the same direction as Figure 1 and showing certain mechanism upon an enlarged scale. Certain of the parts shown in Figure 1 have been omitted in Figure 4;

Fig. 5 is a view similar to Figure 4 upon a still more enlarged scale showing the construction and operation of a specific portion of the mechanism;

Figure 1:
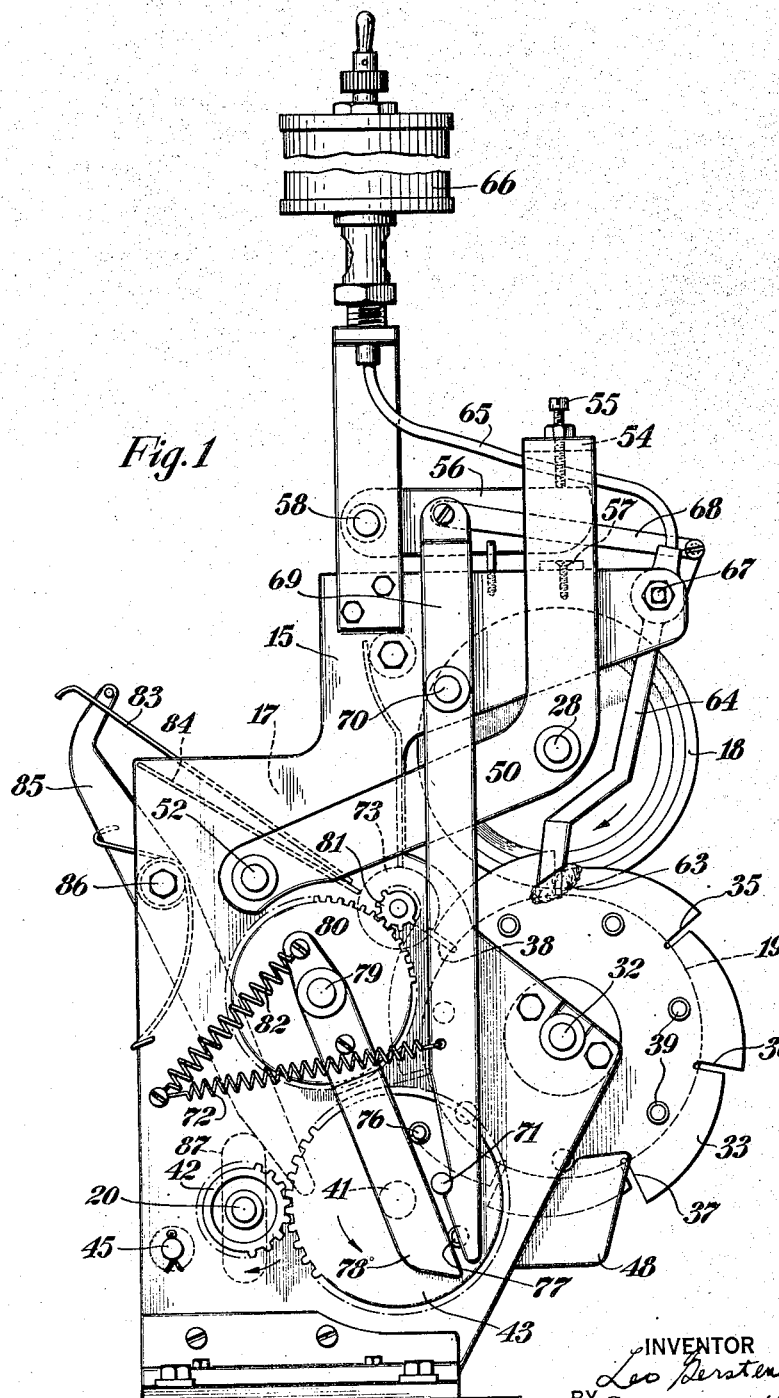
Fig. 1 is an elevational side view of a machine embodying the features of my invention.

Figs. 6–9 inclusive are diagrammatic views taken in the same direction as Figures 1, 4 and 5 and showing various stages in the operation of a specific portion of the mechanism;

Fig. 10 is an enlarged perspective view of an interior portion of the device showing upon an enlarged scale the arrangement of the stick-treating means;

Fig. 11 is a fragmentary cross-sectional view of a portion of Figure 10; and

Fig. 12 is a view showing a completed article.

A suitable framework supports the various shafts transversely thereacross. This framework includes opposite side supports 15 and 16. Between these supports, and to the rear of the machine, a chamber 17 is provided for the reception of untreated sticks. To properly gain a clear conception of the general size and character of the machine, it will be stated that these sticks are laid transversely between the sides 15 and 16 and that these sticks are approximately three to four inches in length.

Figure 2:
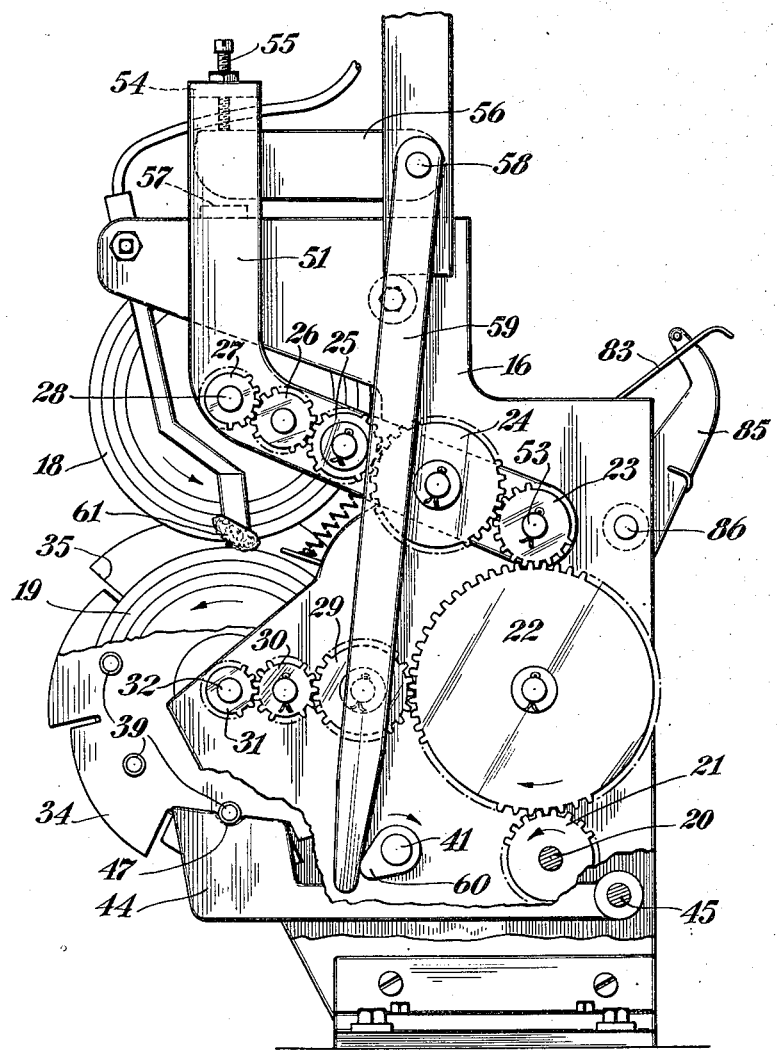
Fig. 2 is an elevational view of the opposite side of the machine, portions being broken away for the sake of clearness.
Figure 3:
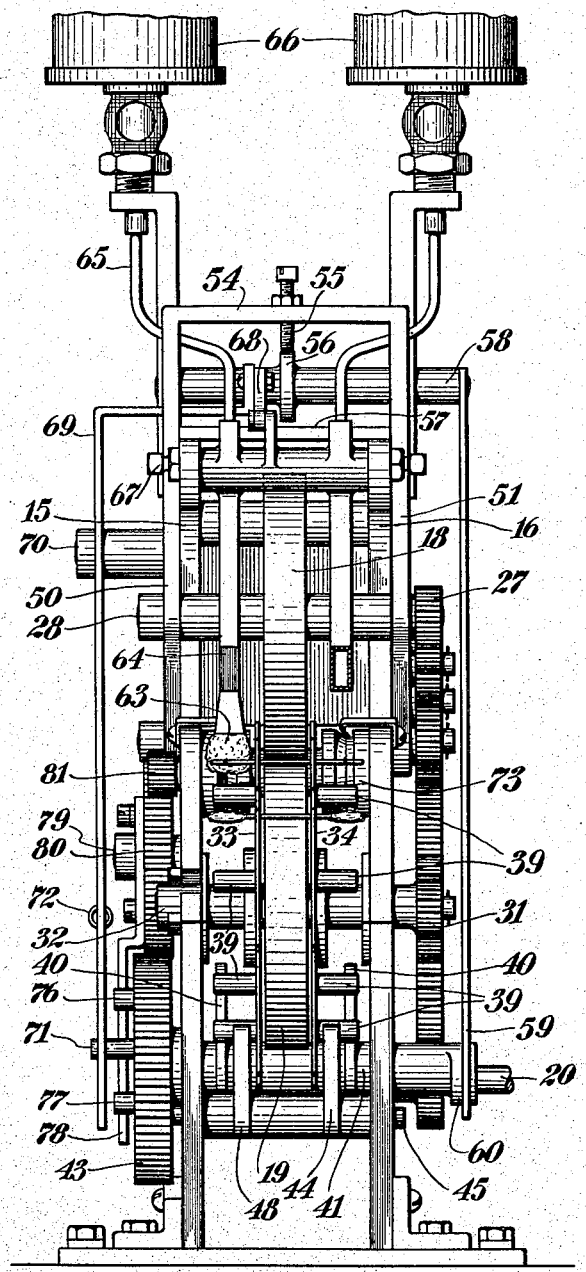
Fig. 3 is a front elevational view showing the general arrangement of the mechanism. This view shows the machine as it appears from the right in Figure 1 and from the left in Figure 2.

Mounted in the forward portion of the machine are two rollers 18 and 19, these rollers being provided with friction surfaces and being mounted one above the other as clearly shown in Figures 1–3. The mechanism rotates these rollers in the same directions, so that when a stick is positioned in sandwiched relationship between them, i. e., along the line drawn through the two centers of rotation, the stick will be twirled. Or, in other words, the rollers 18 and 19 both rotate in a clockwise direction when viewed in Figure 1.

The mechanism is constantly driving these rollers as shown most clearly in Figure 2. 20 is the main drive shaft connected to a suitable source of energy such as a motor. A gear 21 mounted thereon rotates a relatively larger gear 22, and two chains of gears lead from the gear 22 to the shafts, respectively, of the rollers 18 and 19. The chain of gears leading to the roller 18 includes the gears 23, 24, 25, 26, and 27, the last named gear being mounted upon the shaft 28 of the roller 18. The chain of gears leading to the roller 19 includes the gears 29, 30, and 31, the last named gear being mounted upon the shaft 32 of the roller 19.

Coaxially mounted with respect to the roller 19, but not rotatably associated therewith, are two discs 33 and 34 which are positioned closely adjacent to the opposite sides of the roller 19 as shown in Figure 3. These discs serve as stick-transporting or stick-carrying elements and are provided, with this object in view, with a series of radial grooves 35, 36, and 37, etc. Reference to Figure 1 will show that the diameters of the discs 33 and 34 are larger than the diameter of the roller 19, and that each groove extends from the periphery of the disc in a radial direction to a point which terminates approximately in line with the periphery of the roller 19. It will be noted further that one side of each groove is shorter than the opposite side. The shorter side is the relatively advanced side, since the disc 33 in Figure 1 is rotated, in a manner presently to be described, in a step by step clockwise rotation.

In Figure 1, the groove immediately behind the groove 35 is shown in the operative or twirling position, i. e., immediately between the rollers 18 and 19. Without at this time going into a detailed description of the mechanism for successively withdrawing a stick from the supply of sticks, I will state briefly that the discs 33 and 34 are spaced approximately two inches apart, i. e., a distance less than the length of the sticks, and that therefore a stick may be spanned across aligned grooves and be supported thereby at points spaced from the ends of the stick yet on opposite sides of the center thereof. The discs 33 and 34 are rotated in unison, with corresponding grooves always in alignment, and the movement is a step by step one whereby each set of aligned grooves successively positions itself in one of the positions shown in Figure 1. While the discs are in the position of Figure 1, a stick is being fed to the set of grooves 38, while the stick in the uppermost groove is being twirled and acted upon, and while the stick in the groove 36 is on the point of falling out in front of the machine by virtue of its own weight.

The mechanism for advancing the discs 33 and 34 in this step by step manner is shown more clearly in Figure 5. Each disc is provided on its external surface with a series of spaced pins or pegs 39, there being just as many pegs as there are grooves. A wiper 40 mounted upon a shaft 41 serves to advance one of the discs in a step by step manner by successively encountering the pegs 39. In other words, the shaft 41 of Figure 5 is constantly rotated in a counterclockwise direction, carrying the wiper 40 with it. When the wiper is in the full line position, it is just encountering one of the pegs 39, and as it continues to rotate, it forces this peg upwardly and rotates the disc 33 in a clockwise direction. When the wiper is in the dot and dash position, it has exhausted its ability to move the peg, and will have no effect upon the disc 33 until it again rotates into the full line position. Obviously, the wiper is of such a size that the fragmentary rotation it imparts to the disc 33 will be just sufficient to advance the grooves one step.

It may be noted that the shaft 41 obtains its constant rotation from the main drive shaft 20 by virtue of the intermeshing of the gear 42 on the shaft 20 with the gear 43 on the shaft 41.

A corresponding wiper, not shown in Figure 5, is located in a corresponding position adjacent to the external surface of the disc 34, but is similarly mounted upon the shaft 41 and is therefore operable to advance the disc 34 in unison with the advance of the disc 33.

To assure the proper step by step positioning of the discs 33 and 34, I provide a detent arrangement which cooperates with the pegs 39. This arrangement is illustrated most clearly in Figure 2. It comprises two arms, of which the arm 44 is shown in Figure 2. This arm is not connected in any way with the drive shaft, but is pivoted at the rear of the machine to a spindle 45 and is constantly urged upwards by means of a spring 46. (Figure 4.) The forward upper face of the arm 44 is provided with a notch or recess 47 into which one of the pegs upon the disc 34 will snap when the disc is advanced. The arm 44 thereby retains the disc 34 in a fixed predetermined position until the disc is again given a partial advanced rotation by means of its wiper. When this occurs, the peg will disengage itself automatically from the recess 47, because the latter is very shallow and because the arm 44 is obviously yieldable by virtue of the spring 46. A similar detent arm 48 is mounted on the opposite side of the machine and engages the pegs 39 in a similar manner, the arm 48 being similarly pivoted upon the spindle 45 and being urged upwardly by a spring corresponding to the spring 46.

The rollers 18 and 19 are normally in such close adjacence that a stick will frictionally accommodate itself in sandwiched relationship between them. Each time the discs 33 and 34 are advanced, however, during which time a completed stick is moved forwardly from the operative sandwiched position and a new stick is moved forwardly into the operative sandwiched position, it is desirable to separate the rollers 18 and 19 by a slight amount. To effect this momentary separation at these predetermined times, I have provided means for raising the shaft 28 of the roller 18. The shaft 28 is mounted between arms 50 and 51, these arms being pivoted to the framework at their rear ends 52 and 53 and being united across the top by a bar or strip 54. Extending downwardly through the bar 54 is a bolt 55, and the weight of the arms 50 and 51 cause the bolt 55 to bear down constantly upon a block or arm 56, the latter normally resting upon a portion 57 of the framework. When the arms 50 and 51 are in their normal positions, the shaft 28 is so positioned that the rollers 18 and 19 are in their closest relationship. To effect a momentary separation of these rollers, the arm or block 56 is caused to bear upwardly at predetermined times against the bolt 55, thereby pivoting the arms 50 and 51 in an upward manner. Accordingly, the arm 56 is rigidly mounted at its rear end upon a fixed shaft 58. In Figure 2, it will be noted that a lever or arm 59, also fixed to the shaft 58, is actuated at its lower end by a cam 60 mounted upon the shaft 41. The shaft 41 rotates in a clockwise direction in Figure 2, and the cam 60 is so constructed and arranged that it will oscillate the arm 59 at predetermined intervals to raise the block 56 and thereby move the roller 18 upwardly.

As each stick is brought into the operative sandwiched position, it is twirled by virtue of the contact therewith of the rollers 18 and 19. Its ends, however, project beyond the discs 33 and 34 so that an operator standing in front of the machine may apply a wad of cotton with each hand to each end of the stick. The twirling of the stick will cause this wad to be firmly mounted and wound about the stick end and thereby form a swab. While the stick is still being twirled, an applicator bears down upon each freshly formed swab and medicates the latter, as by moistening it with boric acid. Each applicator consists of a wick or the like mounted in the end of a pipe through which boric acid or other medication is applied. Thus, the applicator 63 is mounted in the end of a pipe 64 leading upwardly through a tube 65 to a well 66 filled with the necessary medication.

These applicators are normally in a withdrawn position with respect to the operative sandwiched position. At predetermined timed intervals, and more specifically, at times shortly before the completion of the twirling and after the swabs have been formed upon the stick ends, the applicators are caused to move downwardly into the positions shown in Figures 1 and 2. This downward movement causes the wicks to bear upon and thereby medicate the newly formed swabs. They are then both withdrawn again to their normal positions while the completed swab is advanced, ready for discharge, and a new unswabbled stick is brought into the operative sandwiching position. This movement of the applicators is effected by means of the mechanism which is shown most clearly in Figure 1. The arm 64 (and the corresponding arm on the opposite side of the roller 18) is pivoted at 67. This pivot is given an oscillating movement at predetermined times by a link 68 pivotally associated at its rear end with a rod or lever 69. The latter is pivoted at 70 and extends downwardly in a manner whereby its lowermost end may be actuated by a pin 71 projecting outwardly from the gear wheel 43. The lowermost surface of the rod 69, i. e., the surface which is encountered and moved by the pin 71, is so shaped, as shown in Figure 1, as to impart to the applicators a relatively slow advance to applicating positions and a relatively rapid retraction to normal positions. The retractive movement is effected by the spring 72 which constantly tends to pull the lower portion of the rod 69 rearwardly.

I will now describe the mechanism which successively withdraws the sticks from the hopper and feeds them to the discs 33 and 34. Referring to Figure 4, it will be noted that the bottom of the hopper 17 is formed by the curved surface of a roller 73. This roller is provided with a groove 74 (see also Figures 6–10) and the roller 73 is given a predetermined oscillating movement which positions the groove 74 alternately beneath the supply of sticks and over the receiving grooves 75 in the discs 33 and 34.

The movement of the roller 73 is, however, not a purely oscillating one between these two positions, otherwise it might fail to pick up one of the sticks while it is beneath the supply of sticks. Accordingly, I have provided mechanism which oscillates the roller 73 in such a manner that the groove 74 will move (a) from the position of Figure 4 in a counterclockwise direction through the position of Figure 6 to the position of Figure 7, (b) then back in a clockwise direction to the position of Figure 8, (c) then back again in a counterclockwise direction to the position of Figure 9 (the same as in Figure 7), (d) and finally in a clockwise direction back to the position of Figure 4. During the oscillation of the groove beneath the supply of sticks, one stick will accommodate itself therein, and when the groove finally returns to the position of Figure 4, this stick will drop into the groove 75 shown in Figure 4 (and the corresponding groove in the disc 33) ready for transportation to the operative position between the rollers.

This oscillating movement of the roller 73 is effected by means of two pins 76 and 77 projecting from the outer surface of the gear wheel 43, and a lever 78 actuated by these pins. This cooperation is shown most clearly in Figures 1 and 6–10. It will be noted that the lever 78 is mounted upon a shaft 79, and that a gear wheel 80 mounted upon the shaft 79 meshes with a relatively small gear wheel 81 which rotates the roller 73.

In Figure 1 the pins 76 and 77 are so positioned that the lever 78 is in one extreme position. The wheel 43 rotates in a counterclockwise direction as viewed in Figures 1, 6–10, and it will be obvious that the pin 76 will function to move the lower portion of the lever 78 to the left, thereby rotating the gear wheel 80 in a clockwise direction and the roller 73 in a counterclockwise direction. Figure 6 shows the parts in an intermediate position wherein the pin 76 is still forcing the lever 78 to the left and wherein the groove 74 is on its way from the position of Figure 4 to the position of Figure 7. When the pin 76 has reached the position of Figure 7, it will have exhausted its ability to move the lever 78, and the spring 82 will become operative to move the lever 78 in the opposite direction. Such return movement of the lever 78 will continue until the pins are in the position of Figure 8, and during this time, the groove 74 will have returned from the position of Figure 7 to the position of Figure 8. At this time, the pin 77 becomes operative to move the lever 78 to the left, and this movement will continue until the pin 77 is in the position of Figure 9, at which time it too will have exhausted its ability, and the spring 82 will then become operative to return the lever 78 to the position of Figure 1. While the pin 77 is operative, however, the groove 74 will have moved from the position of Figure 8 to that of Figure 9; and the return of the lever 78 to its initial position of Figure 1 will cause the groove 74 (now occupied by a stick) to move forwardly to the position of Figure 4 wherein the stick will drop into the receptive grooves.

To further assure the proper positioning of a stick within the groove 74, I provide an agitating plate or agitator 83 which overlies the rear wall 84 of the hopper 17 and which moves back and forth as shown most clearly in Figures 6–10. This agitator is given this movement by means of the lever 85 pivoted at 86 and actuated at its lower end by the elliptical cam 87 mounted upon the shaft 20.

I will now describe in greater detail what happens to the stick which falls into the groove 74. During the movement of the roller 73 from the position of Figure 9 to that of Figure 4, the stick is made to encounter a blade 88 (Figures 10 and 11) which is fixed and so positioned and constructed that a niche will be whittled into the stick adjacent its end. A corresponding blade (not shown in Figures 10 and 11) achieves the same purpose with respect to the opposite end portion of the stick. Accordingly, when the stick drops into the grooves in the discs 33 and 34 it is already in a treated condition for firm application thereto of the cotton wads.

During the movement to the operative twirling position, no further treatment is imparted to the stick, but a retaining plate 89 (Figure 4) serves to prevent a possible dislocation of the stick. The plate 89 is pivoted at 90 to a fixed portion 91 of the machine, and a compression spring 92 forces the plate 89 downwardly so that no escape is possible for the stick.

The niche which is whittled into the end portion of the stick is one which is directed toward the end of the stick. In other words, a slight pointed projection is placed upon the stick by the formation of this niche, and it is to be noted that this projection points toward the center of the stick. In this way, the cotton wad subsequently applied will be held firmly to the stick. In the appended claims, the treatment imparted to the stick by the blade 88 and the corresponding blade is termed "burring" in the absence of a more specific definition. In will be obvious that the effect of the knife 88 is the same as that of burring the stick.

The operation of the device is extremely simple and efficient, and the partial descriptions hereinbefore given are believed to be sufficiently clear to preclude the necessity for further disclosure. It may be stated, however, that sticks are fed with great rapidity to the twirling position, the twirling is then effected only long enough to permit the operator to apply the wads of cotton to the ends and to permit the applicators to bear down for an instant upon the newly formed swabs, and the completed sticks are then discharged at a rapid rate into a box or receptacle placed in front of the machine. A re-feeding of the hopper may be effected without a stoppage of the machine, and the same is true of the wells containing the medication. Obviously, medication may be dispensed with where desired by simply turning off the supply thereof.

My machine may be modified in many respects by those skilled in the art without departing from the spirit thereof. For example, the wells 66 may be used as containers for mild adhesive, and the timing of the device may be such that this adhesive is applied to the stick ends prior to the application thereto of the cotton wads. Or, an additional pin similar to the pin 71 may be provided so as to duplicate the movement of the applicators and thereby permit medication both upon the stick and upon the finished swab. In general, many of the details herein described and illustrated to explain the nature of my invention may be changed by those skilled in the art without departing from the spirit and scope of the invention as expressed in the appended claims. It is therefore intended that these details be interpreted as illustrative and not in a limiting sense.

Having thus described my invention and illustrated its use, what I claim as new and desire to secure by Letters Patent is—

1. In a machine for making swabs of the character described, means for grasping and twirling a stick intermediate its ends so that wads of cotton applied to said ends will form swabs thereover, said means including a pair of friction rollers adapted to sandwich the stick between them.

2. In a machine for making swabs of the character described, means for grasping and twirling a stick intermediate its ends so that wads of cotton applied to said ends will form swabs thereover, said means including a pair of constantly rotating friction rollers arranged along spaced axes and adapted to sandwich the stick between them with its axis parallel to their own axes.

3. In a machine for making swabs of the character described, means for grasping and twirling a stick intermediate its ends so that wads of cotton applied to said ends will form swabs thereover, said means including a pair of friction rollers adapted to sandwich the stick between them, a stick carrier, and means for operating the latter to bring the stick into said sandwiched position.

4. In a machine for making swabs of the character described, means for grasping and twirling a stick intermediate its ends so that wads of cotton applied to said ends will form swabs thereover, said means including a pair of friction rollers adapted to sandwich the stick between them, and a stick carrier constructed and arranged to support the stick in a rotatable manner.

5. In a machine for making swabs of the character described, means for grasping and twirling a stick intermediate its ends so that wads of cotton applied to said ends will form swabs thereover, said means including a pair of friction rollers adapted to sandwich the stick between them, and a stick carrier constructed and arranged to support the stick in a rotatable manner with its ends free and its intermediate portion accessible to said rollers.

6. In a machine for making swabs of the character described, means for grasping and twirling a stick intermediate its ends so that wads of cotton applied to said ends will form swabs thereover, said means including a pair of friction rollers adapted to sandwich the stick between them, and a stick carrier constructed and arranged to support the stick in a rotatable manner at points spaced from both the ends and the intermediate portion of the stick.

7. In a machine for making swabs of the character described, means for grasping and twirling a stick intermediate its ends so that wads of cotton applied to said ends will form swabs thereover, said means including a pair of friction rollers adapted to sandwich the stick between them, and a stick carrier constructed and arranged to support the stick in a rotatable manner at points alongside of the sandwiched intermediate portion.

8. In a machine for making swabs of the character described, means for grasping and twirling a stick intermediate its ends so that wads of cotton applied to said ends will form swabs thereover, said means including a pair of friction rollers adapted to sandwich the stick between them, and a stick carrier comprising a disc having a slot extending inwardly from its periphery and adapted to accommodate the stick therein.

9. In a machine for making swabs of the character described, means for grasping and twirling a stick intermediate its ends so that wads of cotton applied to said ends will form swabs thereover, said means including a pair of friction rollers adapted to sandwich the stick between them, and a stick carrier comprising a pair of spaced discs having marginally disposed radial slots which are adapted to accommodate the stick therein.

10. In a machine for making swabs of the character described, means for grasping and twirling a stick intermediate its ends so that wads of cotton applied to said ends will form swabs thereover, said means including a pair of friction rollers adapted to sandwich the stick between them, and a stick carrier comprising a pair of discs mounted coaxially with one of said rollers yet independently thereof.

11. In a machine for making swabs of the character described, means for grasping and twirling a stick intermediate its ends so that wads of cotton applied to said ends will form swabs thereover, said means including a pair of friction rollers adapted to sandwich the stick between them, and a stick carrier comprising a pair of discs arranged on opposite sides of one of said rollers, said discs having an aligned set of slots for supporting the stick therein with its medial portion extending transversely across said roller.

12. In a machine for making swabs of the character described, means for grasping and twirling a stick intermediate its ends so that wads of cotton applied to said ends will form swabs thereover, said means including a stick carrier which comprises a pair of discs having an aligned set of slots.

13. In a machine for making swabs of the character described, means for grasping and twirling a stick intermediate its ends so that wads of cotton applied to said ends will form swabs thereover, said means including a stick carrier which comprises a pair of discs arranged and constructed to carry the stick in a rotatable manner between them.

14. In a machine for making swabs of the character described, means for grasping and twirling a stick intermediate its ends so that wads of cotton applied to said ends will form swabs thereover, and means for thereupon discharging said stick from the machine.

15. In a machine for making swabs of the character described, means for grasping and twirling a stick intermediate its ends so that wads of cotton applied to said ends will form swabs thereover, and means for thereupon discharging said stick from the machine, said last named means including a stick carrier movable into and out of twirling position, and means for moving the carrier out of said position at a predetermined time.

16. In a machine for making swabs of the character described, means for grasping and twirling a stick intermediate its ends so that wads of cotton applied to said ends will form swabs thereover, and means for thereupon discharging said stick from the machine, said last named means including a stick carrier which comprises a rotatable disc, said disc having a marginal slot for supporting the stick in predetermined angular positions of the disc and dropping the stick at other positions thereof.

17. In a machine for making swabs of the character described, means for grasping and twirling a stick intermediate its ends so that wads of cotton applied to said ends will form swabs thereover, and means positioned adjacent said ends for automatically applying medication to said swabs as they are twirled.

18. In a machine for making swabs of the character described, means for grasping and twirling a stick intermediate its ends so that wads of cotton applied to said ends will form swabs thereover, and means for applying medication to said swabs, said last named means including applicators movable onto and off said swabs, and means for moving the applicators at predetermined times.

19. In a machine for making swabs of the character described, means for grasping and twirling a stick intermediate its ends so that wads of cotton applied to said ends will form swabs thereover, and means for applying medication to said swabs, said last named means including pivotally mounted applicators movable onto and off said swabs when pivoted, and means for pivoting said applicators at predetermined times.

20. In a machine for making swabs of the character described, means for grasping and twirling a stick intermediate its ends so that wads of cotton applied to said ends will form swabs thereover, and means for applying medication to said swabs, said last named means including pivotally mounted applicators movable onto and off said swabs when pivoted, and means for pivoting said applicators at predetermined times, said last named means comprising a driving wheel provided with a pin, and a pivotally mounted lever actuated by said pin during the rotation of the driving wheel.

21. In a machine for making swabs of the character described, means for grasping and twirling a stick, and means positioned adjacent an end of the stick for automatically applying medication thereto at a predetermined time during the twirling.

22. In a machine for making swabs of the character described, means for grasping and twirling a stick, and means for applying medication thereto at a predetermined time during the twirling, said last named means comprising an applicator movable onto and off the stick and means for moving the applicator at predetermined times.

23. In a machine for making swabs of the character described, means for grasping and twirling a stick, and means for applying medication thereto at a predetermined time during the twirling, said last named means comprising an applicator movable onto and off the stick and means operable in timed relation to the twirling means for moving the applicator at predetermined times.

24. In a machine for making swabs of the character described, means for grasping and twirling a stick, and means for applying medication thereto at a predetermined time during the twirling, said last named means comprising an applicator which includes a conduit, a well of medication at one end, and a wick at the other.

25. In a machine for making swabs of the character described, means for grasping and twirling a stick, and means for applying medication thereto at a predetermined time during the twirling, said last named means comprising an applicator which includes a pivotal conduit, a supply well therein, a wick at one end, and means for pivoting the conduit at predetermined times to advance and withdraw the wick from the stick.

26. In a machine for making swabs of the character described, means for grasping and twirling a stick intermediate its ends so that wads of cotton applied to said ends will form swabs thereover, means for applying medication to said swabs, and means for thereupon discharging said stick from the machine, said medication-applying means comprising a movable applicator, said discharging means comprising a movable stick carrier, and means for moving said applicator and stick carrier in timed relation.

27. In a machine for making swabs of the character described, a supply of sticks, means for withdrawing a stick therefrom, means for burring the stick adjacent to at least one end, and means for twirling the stick with its end accessible, so that a wad of cotton applied to said end will form a firmly supported swab thereover.

28. In a machine for making swabs of the character described, a supply of sticks, means for withdrawing a stick therefrom, means for burring the stick adjacent to at least one end, and means for twirling the stick with its end accessible, so that a wad of cotton applied to said end will form a firmly supported swab thereover, said burring means being operable upon the stick after its withdrawal and before twirling thereof.

29. In a machine for making swabs of the character described, a supply of sticks, means for withdrawing a stick therefrom, means for burring the stick adjacent to at least one end, and means for twirling the stick with its end accessible, so that a wad of cotton applied to said end will form a firmly supported swab thereover, and said burring means comprising a knife operable upon the stick after its withdrawal and before twirling thereof, said knife being constructed and arranged to partially whittle the stick.

30. In a machine for making swabs of the character described, a supply of sticks, means for withdrawing a stick therefrom, means for burring the stick adjacent to at least one end, and means for twirling the stick with its end accessible, so that a wad of cotton applied to said end will form a firmly supported swab thereover, said withdrawing means including a stick-transporting roller, and said burring means comprising a knife encounterable by the stick during the movement of said roller.

31. In a machine for making swabs of the character described, a supply of sticks, and means for successively grasping said sticks and twirling them so that a wad of cotton applied to an end thereof will form a swab thereover.

32. In a machine for making swabs of the character described, a supply of sticks, and means for successively grasping said sticks and twirling them so that wad of cotton applied to an end thereof will form a swab thereover, said means comprising a stick-transporting roller adjacent to the supply, a stick carrier, and means for moving the roller to transport a stick from the supply to the carrier.

33. In a machine for making swabs of the character described, a supply of sticks, and means for successively grasping said sticks and twirling them so that a wad of cotton applied to an end thereof will form a swab thereover, said means including a roller having a stick-receiving groove, and means for moving the roller to present the groove to the stick supply.

34. In a machine for making swabs of the character described, a supply of sticks, and means for successively grasping said sticks and twirling them so that a wad of cotton applied to an end thereof will form a swab thereover, said means including a roller having a stick-receiving groove, and cam means for moving the roller to present the groove during movement thereof to the stick supply.

35. In a machine for making swabs of the character described, a supply of sticks, and means for successively grasping said sticks and twirling them so that a wad of cotton applied to an end thereof will form a swab thereover, said means including a roller underlying and supporting the stick supply, said roller having a groove adapted to accommodate one stick, and means for moving said roller to present the groove in motion to the stick supply.

36. In a machine for making swabs of the character described, a supply of sticks, and means for successively grasping said sticks and twirling them so that a wad of cotton applied to an end thereof will form a swab thereover, said means including a roller underlying and supporting the stick supply, said roller having a groove adapted to accommodate one stick, a stick carrier, and means for moving said roller so as to oscillate the groove beneath the sticks and then transport the received stick to the carrier.

37. In a machine for making swabs of the character described, a supply of sticks, and means for successively grasping said sticks and twirling them so that a wad of cotton applied to an end thereof will form a swab thereover, said means including a roller underlying and supporting the stick supply, said roller having a groove adapted to accommodate one stick, a stick carrier, and means for moving said roller so as to oscillate the groove beneath the sticks and then transport the received stick to the carrier, said means comprising a driving wheel having pins arranged along a chord, and a crank operable by said pins during rotation of the driving wheel.

38. In a machine for making swabs of the character described, a supply of sticks, and means for successively grasping said sticks and twirling them so that a wad of cotton applied to an end thereof will form a swab thereover, and means positioned adjacent the stick which is being twirled for automatically applying medication to said swab during the twirling thereof.

39. In a machine for making swabs of the character described, a supply of sticks, means for successively grasping said sticks, means for burring each grasped stick adjacent to at least one end, means for twirling said stick with its end accessible so that a wad of cotton applied to said end will form a firmly secured swab thereover, and means for successively discharging the completed swab sticks.

40. The herein described method of making swabs which comprises the steps of twirling a stick intermediate its ends, simultaneously applying a wad of cotton to each twirling end, and simultaneously applying medication to the two swabs formed thereby.

In witness whereof I have signed this specification.

LEO GERSTENZANG.